R. SHEPHERD.
HARROW.
No. 175,881.        Patented April 11, 1876.
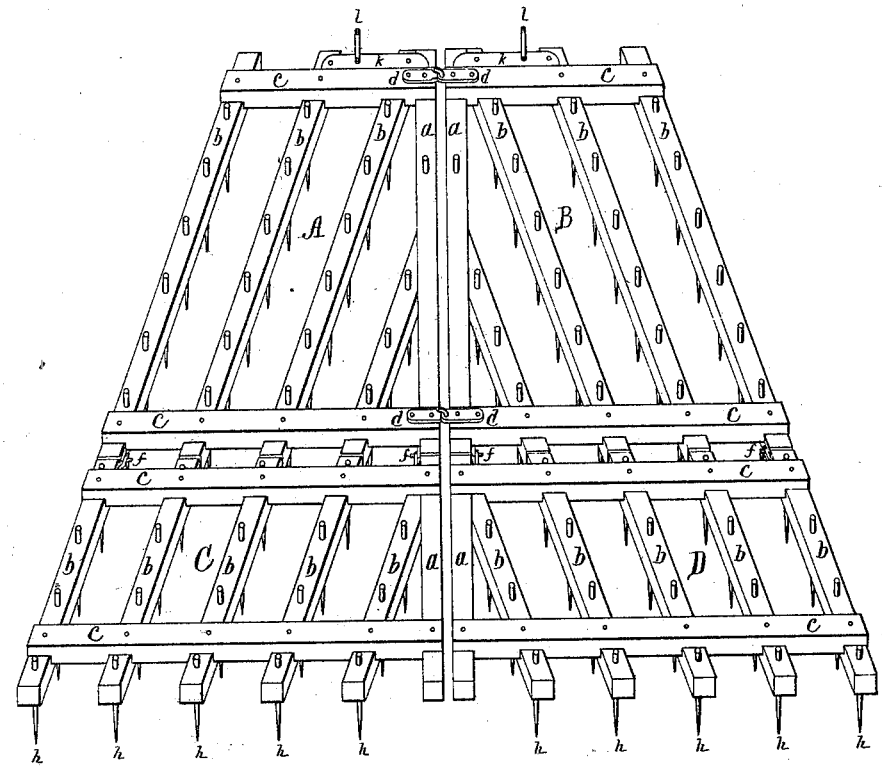
Attest.
A. O. Behel
W. F. Behel
Inventor:
Reason Shepherd.
Per Jacob Behel,
Atty.

UNITED STATES PATENT OFFICE.

REASON SHEPHERD, OF ROCKFORD, ILLINOIS.

IMPROVEMENT IN HARROWS.

Specification forming part of Letters Patent No. 175,881, dated April 11, 1876; application filed November 12, 1875.

*To all whom it may concern:*

Be it known that I, REASON SHEPHERD, of the city of Rockford, State of Illinois, have invented a Harrow, of which the following is a specification:

The object of my invention is to provide a flexible harrow, for farm-cultivation, that will conform more nearly to the inequalities of the surface of the ground, and of such construction as to permit of the teeth being set to cut narrow furrows, without lessening the distance between the teeth, in the direction of the line of draft; and is composed of sections hinged together in such a manner as to permit of great flexibility, and to be readily separated and used in separate sections and in separate combinations when smaller harrows are required, and to combine in one complete whole different-sized harrows, complete in the several different separate sections, or in several different combinations, hereinafter more fully described.

The drawing is an isometrical representation of a harrow embodying my invention, the outline of which, as a whole, is in form the central vertical section of a truncated cone, and is divided transversely into two sections, A B and C D, each of which separately, considered as a whole, shows similar sections of a truncated cone, and is also divided centrally lengthwise into two sections, A C and B D, which separately, considered as a whole, are semi-sections of the same cone, and the four sections, A, B, C, and D, separately considered as a whole, are also semi-sections of a truncated cone, and each section, considered as a whole, is composed of bars $a$, lying parallel to the axis of the cone, which is the line of draft, and of bars $b$, lying in the same plane, parallel to the sides of the cone, and equidistant from each other, and at an acute angle with the bar $a$ and opening rearward; all of which are held in place by transverse bars $c$, gained onto the upper side of the bars $a$ and $b$, to which they are secured in place by bolts or otherwise, one on the forward and one on the rear portion of each section. The forward sections A and B are placed side by side with the bars $a$, central and parallel to each other, and are centrally connected by hook-and-eye hinges $d$ secured on the inner ends of transverse bars $c$ in such a manner as to permit the outside of the sections to vibrate vertically independent of each other, to conform to the inequalities of the surface of the ground, and to be readily disconnected by raising the outside of one of the sections so as to cause the hinges to unhook. The rear sections C and D are connected to their corresponding forward sections, respectively, by hook-and-eye hinges $f$ secured to the outside bars $a$ and $b$ of the respective sections in such a manner as to permit of a free independent vertical movement of the rear ends of the rear sections C and D, and also to conform to the vertical movements of the sides of the forward sections A and B, but independent of the vertical movements of their forward ends. $h$ are teeth which may be of any of the usual forms, but in this instance are made from round bars of any suitable material, cut to proper lengths, pointed and inserted in the bars $a$ and $b$ about the usual distance between centers, and slightly inclined rearward so as to more readily pass obstructions, the bars $b$ being placed at a more acute angle with the line of draft than is usual in common harrows. The teeth will cut furrows of less width without lessening the distance between the teeth in the direction of the length of the bars, which will lessen the liability to clog, and the strain upon the teeth will be more nearly lengthwise of the bars, and consequently less tendency to split or wrench them from their fastenings, and also the tendency to carry obstructions from the center toward the outsides will be greater than in harrows having their bars at a greater angle with the line of draft as usually constructed. Draft-plates $k$ are secured to the forward ends of bars $a$ and $b$ of the forward sections A and B, and are provided with draft-links $l$, to which the eveners or whiffletrees are to be attached.

The harrow represented in the drawing is designed for practical use on the farm in the following combinations of sections, and of single independent sections: first, as a whole, consisting of the four sections A, B, C, and D; second, as a whole, consisting of the two forward sections A and B; third, as a whole, consisting of the forward section A and the rear section C; fourth, as a whole, consisting of the forward section B and the rear section D; fifth, as a whole, each of the four sections A, B, C, and D, separately.

I am aware that flexible harrows have been used, composed of sections hinged to each other and capable of separate and combined use, and I do not, therefore, claim to be the first to construct and use such harrows; but

I claim as my invention—

A harrow composed of sections A, B, C, and D, with the forward sections A and B hinged together to yield or fold parallel with the line of draft, and sections C and D hinged to and in the rear of the first-named sections, and at the same time fold or yield at right angles to the line of draft, constructed and operating substantially as described.

REASON SHEPHERD.

Witnesses:
A. O. BEHEL,
E. J. BEHEL.